Patented May 26, 1942

2,284,523

UNITED STATES PATENT OFFICE 2,284,523

NITRATED PETROLEUM PHENOL COMPOSITION

Henry B. Kellog, Union City, N. J., and Peter J. Gaylor, Staten Island, N. Y., assignors to Standard Oil Development Company, a corporation of Delaware No Drawing. Application December 10, 1938, Serial No. 244,916

8 Claims. (Cl. 167—28)

This invention relates to the production of new and novel nitrated petroleum phenols. More specifically, it deals with compositions such as insecticides containing nitro derivatives of petroleum phenols as the active ingredients.

The effectiveness of simple phenols, cresols, and the like, as well as their nitrated derivatives as toxic agents in insecticidal preparations, has been recognized in the art. However, such compositions have been subject to certain disadvantages in actual use, the chief of which is their well known tendency to injure foliage with resultant defoliation and retardation of normal development as well as the depression of plant metabolism when employed in concentrations sufficiently high to kill insects, their eggs and larvae. Furthermore, when employed in insecticidal sprays and similar compositions, they rapidly corrode the metallic containers in which they are stored.

The present invention employs certain "modified" nitrated phenolic derivatives which have been found to have less toxic effect upon plant life in parasiticidal concentrations, and which have been found to be exceptionally free of corrosion and other difficulties encountered in the art with nitrated products.

An object of the present invention is to produce novel and extremely effective compositions containing certain nitrated petroleum phenols. A further object is to provide a superior insecticidal preparation in which these nitrated petroleum phenols are employed per se or with other materials. Another object of this invention is to provide a material for parasiticidal purposes in the form of dusting or spraying compositions employed for delicate vegetation, such as fruit trees and similar plants. A still further object of this invention is to provide a parasiticidal material which is relatively non-toxic to man and to domestic animals, and which may be employed in place of lead arsenate or other toxic insecticides without leaving harmful residues upon the objects sprayed.

Certain petroleum distillates, especially the lighter ones, will, upon alkali treatment and acidification of the alkali extract, yield phenolic bodies similar to cresols and other simple phenols of the type obtained from coal tar and other well known sources. This type of treatment, however, does not remove all of the phenolic bodies from petroleum distillates, and especially in the case of the heavier distillates such as kerosenes, gas oils and lubricating stocks. If these particular latter materials are treated with alcoholic solutions of strong alkalies, phenolic products are obtained which are not simple phenols but more highly oxygenated materials, as has been established by combustion and other analyses. It is with these "modified" phenols that the present application is involved. By nitration of these latter phenolic bodies, it has been found that exceptionally potent parasiticides may be prepared which nevertheless exhibit relatively little injury to the plant or animal tissues themselves. This is in contra-distinction to the simple nitrated alkylated phenols which appear to become absorbed readily by living tissues and are very toxic thereto. The structure of the "modified" phenols discussed above has not been definitely ascertained, but it is known that some of the oxygen in the molecule is not in the form of a phenolic radical but possibly in the form of an ether or similar grouping. These groupings may contribute to the low corrosive tendencies of such compounds as well. On the other hand, the compounds are exceedingly toxic to the lower forms of life, especially against parasites of the type of insects, fungi, molds, and the like.

In preparing the compositions which are the subject of this invention, petroleum hydrocarbons, preferably those boiling above 500° F. or 600° F., and especially straight run, cracked or destructively hydrogenated distillates from East Indian, South American or Mexican crudes, are employed as raw materials. The concentration of the desired phenolic substances in these stocks varies from about 0.1 to 2%. In extracting these phenolic bodies, an alcoholic solution of a strong alkali is most effective, and this may be done after a plain extraction with aqueous alkali to remove simple phenols or other acidic substances if the latter are present in the particular source material. The modified phenolic bodies with which this invention is concerned are unextractable from their source material with aqueous alkali, and for this reason their recovery must be effected by the additional use of an auxiliary solvent such as alcohol or other solvent non-reactive with the phenolic material and miscible in the alkali solution employed. It is, of course, understood that the extracting medium must necessarily be immiscible with the petroleum source material at the extraction temperature.

As a strong alkali, the alkali metal bases, such as caustic soda or caustic potash or onium type bases, such as trimethyl sulfonium hydroxide, benzyl trimethyl ammonium hydroxide, and the like, may be employed. The auxiliary solvent may be a lower alcohol, such as the aliphatic alcohols (methyl, ethyl, isopropyl, etc.) or glycols, glycerols, polyglycols and polyglycerols, dioxan, glycol or glycerol mono-esters or similar compounds. The preferred materials are the lower aliphatic mono-alcohols. It is desirable that no more than about 5% water be present in such solvents and that the amount of alkali employed vary from 3% to 15% of the solvent used or more, depending on the concentration of the phenolic bodies, the type of stock treated, and the like. About 1-10% by volume (on the oil treated) of the total solvent is generally employed to obtain good extraction. The preferred extraction temperature is room temperature, although lower (down to −30° C.) or higher (up to 100° C.) temperatures may be advantageously employed. Countercurrent extraction is preferable.

By such treatment these phenolic bodies are recovered substantially free from hydrocarbon impurities, and they are then nitrated in order to obtain the final desired products which are the subject of this invention. Although the prior art nitration methods may be employed for the production of mono, di or other polynitro derivatives, nitration at elevated temperatures in the vapor phase has been found to be effective with these compounds. For insecticidal purposes, the mono and di-nitro derivatives are preferred, although the higher polynitro products may be used in many cases.

After recovery and purification of the nitro phenolic derivatives, the products may be employed directly as parasiticides, although it is more desirable to dilute them in a non-aqueous medium from the point of view of economy and effectiveness. One of the interesting properties of these nitro derivatives is their potency in dilute solutions. Hence, they are effective even in concentration of less than 1% in mineral while oils and similar base stocks for insecticidal sprays. For horticultural purposes, the oil solutions of these nitro phenolic compounds may be emulsified with water to produce very effective reagents for combating insects and fungi. Even waxes may be treated with small amounts of these nitrated phenols and employed for coating shrubs and similar materials to combat the ravaging effects of pests. Mineral oils, such as gas oil, containing 1-10% of these nitrated phenolic bodies, are excellent for wood impregnation in the building, electrical and railroad industries. The products are also suitable as moth-proofing agents and preservatives for textiles and other fabrics.

Some of the many features involved in this invention will become apparent from the following examples:

*Example 1*

Heavy Talang Akar kerosene (15 gals.), which has been previously treated with aqueous caustic alkali and boiling substantially above 500° F., is extracted with one-half gallon of methyl alcohol containing one-half pound of potassium hydroxide. The mixture is centrifuged, the alcohol layer distilled, and, upon acidification of the distillation residue, 128 grams of crude phenols are recovered. These are vacuum distilled at 5-8 mm. pressure to give the following fractions:

| Fraction | B. P. | Yield | Color |
| --- | --- | --- | --- |
|  | °F. | Grams |  |
| 1 | To 313 | 6.1 | Pale yellow. |
| 2 | 313-440 | 94.0 | Light brown. |
| 3 | 410 | 11.0 | Red brown. |
| Residue |  | 16.3 | Brown tar. |

The phenolic compounds so obtained are generally liquid mixtures varying in viscosity and boiling point, the values of these properties increasing with increase in boiling point of the petroleum source material. They range from about 10 carbon atoms per molecule to 27 carbon atoms or more. In the case of the higher boiling fractions, there is a deficiency in hydrogen which indicates the presence of more than one nucleus, or a condensed nucleus.

*Mono-nitro compounds*

242 grams of the petroleum phenols (approximately one mol) was placed in a one liter 3-neck flask equipped with a mechanical stirrer, a thermometer and a dropping funnel. Approximately an equal volume of spent acid consisting of approximately 87% $H_2SO_4$, 3% $HNO_3$, 10% water obtained from a previous run was added while maintaining good mixing and sufficient external cooling to maintain the phenols at 10-20° C. Mixed acids containing 95 grams of 70% nitric acid and 150 grams of 93% sulfuric acid were then added slowly over a period of approximately one-half hour while maintaining good agitation at 10-20° C. After addition was complete, the reaction mixture was heated to 30° C. and maintained for an additional one-half hour. The two layers were then separated and the oil layer washed with water and then with 5% sodium bicarbonate solution. After an additional water wash the product was freed of water and a small amount of unreacted phenols by heating it to 150° C. under 100 mm. The residue was a dark colored liquid which was principally mono-nitro phenols.

An emulsified horticultural spray prepared from these materials has the following composition:

| | Per cent by weight |
| --- | --- |
| Purified petroleum distillate (29.4 A. P. I.) | 7.00 |
| Mahogany sulfonate | 0.92 |
| Na naphthenate | 0.90 |
| Mono-nitro petroleum phenols | 0.27 |
| Water | 90.91 |

This composition is exceptionally potent as an insecticide without incurring any substantial injury to the foliage and without leaving a sufficiently toxic residue which would be harmful to higher animals.

*Example 2*

A Colombian gas oil, which has been previously treated with aqueous alkali, is extracted in a manner similar to that disclosed in Example 1, and the recovered soaps are extracted three times with 10% by volume of naphtha prior to acidification to liberate the phenols. These phenols are then distilled, the initial boiling point being about 30° C. at 5 mm. pressure. Various cuts are taken off up to about 240° C. at 5 mm. pressure and the residue remaining in the still resembles a hard, tar-like solid. A sample of such phenols is fractionated four times and the following fractions are obtained:

| Fraction | Boiling range | Per cent C | Per cent H |
| --- | --- | --- | --- |
|  | °C |  |  |
| 1 | 30-70 @ 2 mm. |  |  |
| 2 | 70-80 |  |  |
| 3 | 80-90 | 78.7 | 9.06 |
| 4 | 90-100 | 78.89 | 9.36 |
| 5 | 100-110 |  |  |
| 6 | 110-120 | 78.98 | 9.55 |
| 7 | 120-130 | 79.38 | 9.35 |
| 8 | 130-140 |  |  |
| 9 | 140-150 | 79.6 | 9.23 |
| 10 | 150-160 |  |  |
| 11 | 160-170 | 79.99 | 9.3 |
| 12 | 170-180 |  |  |
| 13 | 180-210 | 80.86 | 8.87 |

Of these fractions, fraction 9 is the largest in volume, corresponding to about 35% of the total.

In order to determine the probable constitution of these phenols, a fraction is chosen at random and subjected to analysis. The results indicate that these phenols contain more oxygen than would be attributed to the phenolic group. This can be verified from the following data:

*Composition of fraction 9*

| | |
|---|---|
| Per cent C | 79.60 |
| Per cent H | 9.23 |
| Probable empirical formula $C_{19}H_{26}O_2$ | |
| Mol. wt. (calculated) | 286 |
| Mol. wt. found | 242 |
| Saponification number of acetylated product, calculated | 171 |
| Saponification number of acetylated product, found | 200 |

It can be seen that if both oxygen atoms were phenolic, the acetylated product would have a saponification number of 300 mg. of KOH per gram. If only one of the oxygen atoms were phenolic, the saponification number would be 171 instead of 200 as found in the analysis. This shows that non-phenolic oxygen is present in these compounds.

Fraction 9 described above is then subjected to the following nitration procedure.

*Di-nitro compounds*

242 grams of petroleum phenols (approximately one mol) were placed in a one liter 3-neck flask and 200 grams of 93% sulfuric acid was run in at approximately 25° C. and the mixture vigorously agitated at 75° until approximately one phase was obtained when a sample was diluted with water. The mixture was then diluted with 200 grams of water and the mixture cooled to 50° C. A solution of 200 grams of 70% nitric acid, 25 grams of 93% sulfuric and 50 grams of water was then added slowly to the phenol sulfonates with vigorous agitation while maintaining a temperature of 50° C. by external cooling. Addition was complete in 45 minutes and the temperature was slowly raised to 90° C. and maintained for one-half hour. The oil layer was washed with water and any acidity neutralized with sodium bicarbonate solution. Adhering water was removed by distillation under a partial vacuum. The product solidified to a semi-solid on cooling to room temperature. Nitrogen analysis indicated it to be pricipally di-nitro phenols.

*Poly-nitro compounds*

242 grams of petroleum phenols (approximately one mol) was dissolved in 200 grams of 93% sulfuric acid as described in Example 2. After dilution with 200 grams of water, a solution of 300 grams of 70% nitric acid and 100 grams of 93% sulfuric acid was slowly added while maintaining good agitation at 100° C. The reaction mixture was maintained at this temperature until reaction was complete. The product was separated and purified as previously desired.

In preparing an insecticide according to this invention, 3 lbs. of di- or tri-nitrated petroleum phenols are dissolved in 77 lbs. of a warmed highly refined mineral oil, and added slowly with high speed agitation to 20 lbs. of ammonium laurate which has been heated to 45° C. Stirring is continued until the mixture is cool. This finished base stock gives a clear soluble oil ready for use by simply adding to it 1000 lbs. of water to form a very thin solution.

These new insecticidal compositions may be employed as either dormant or summer sprays, the changes being made in the type of oil distillate used, e. g., high or low viscosity, and in the concentration of the toxic element employed therein, as required. Inasmuch as these new materials function as both contact and stomach poisons, they may be applied as ovicides, aphicides, larvicides, or scalicides with equally effective results.

In the preparation of "soluble oils" for spray purposes, suitable emulsifiers are sodium rosinate, sodium naphthenate, triethanolamine sulfonate, and/or naphthenate, sodium caseinate, ammonium soaps or fatty acids, sodium salt of a modified sulfonated hydrocarbon (Sulfo Turk S), sodium salt of diglycol laurate (diglycol laurate S), and the like. The materials are also compatible with other toxic priniciples such as pyrethrins, rotenone, nicotine compounds, thiocynate derivatives, undecylenamide, etc. They may be dissolved in highly treated kerosene and employed as fly sprays alone or with other ingredients. These materials are also suitable as cattle dips, since they do not exhibit any detrimental physiological effects in the concentrations employed.

Numerous other modifications and alterations may be made within the scope of the present invention which is not to be limited to any specific example or compositions or theories of operation except insofar as covered by the following claims.

We claim:

1. The process for producing a horticultural spray emulsion which consists in first treating a high boiling petroleum distillate with aqueous caustic alkali, then extracting the treated distillate with a strong alkali dissolved in an oil immiscible solvent not reactive with the alkali, removing the solvent from the extract, acidifying the residue to recover oil-soluble petroleum phenols, nitrating the oil-soluble petroleum phenols and emulsifying the nitrated oil-soluble phenols together with a highly refined petroleum distillate in water by means of an emulsifying agent.

2. A readily emulsifiable insecticidal concentrate comprising a highly refined petroleum distillate, a nitrated mixture of mineral oil-soluble petroleum phenols of more than 10 carbon atoms containing oxygen other than that present in the nitro and phenol groups, which nitrated petroleum phenols results from the nitration of the extract secured by first treating a high boiling petroleum distillate with aqueous caustic alkali, removing the aqueous caustic alkali, extracting the treated distillate with a strong alkali dissolved in an oil-immiscible solvent not reactive with the alkali, removing the solvent and acidifying the residue to recover the extract and an emulsifier.

3. A readily emulsifiable insecticidal concentrate comprising a highly refined petroleum distillate, a mixture of nitrated mineral oil-soluble phenols produced by first treating a high boiling petroleum distillate with aqueous caustic alkali, removing the aqueous caustic alkali, extracting the treated distillate with a strong alkali dissolved in an oil-immiscible solvent not reactive with the alkali, removing the solvent from the extract, acidifying the residue to liberate and recover oil-soluble petroleum phenols and nitrating the mineral oil-soluble petroleum phenols and an emulsifier.

4. A readily emulsifiable insecticidal concentrate comprising a highly refined petroleum distillate, a mixture of nitrated mineral oil-soluble phenols produced by first treating a high boiling petroleum distillate with aqueous caustic alkali, removing the aqueous caustic alkali, extracting the treated distillate with a strong alkali dissolved in isopropyl alcohol, removing the isopropyl alcohol from the extract, acidifying the residue to liberate and recover oil-soluble petroleum phenols and nitrating the mineral oil-soluble petroleum phenols and an emulsifier.

5. A readily emulsifiable insecticidal concentrate comprising a highly refined petroleum distillate, a mixture of nitrated mineral oil-soluble phenols produced by first treating a high boiling petroleum distillate with aqueous caustic alkali, removing the aqueous caustic alkali, extracting the treated distillate with an organic onium type base dissolved in an oil-immiscible solvent not reactive with the alkali, removing the solvent from the extract, acidifying the residue to liberate and recover oil-soluble petroleum phenols and nitrating the mineral oil-soluble petroleum phenols and an emulsifier.

6. A readily emulsifiable insecticidal concentrate comprising a highly refined petroleum distillate, a mixture of nitrated mineral oil-soluble phenols produced by first treating a high boiling petroleum distillate with aqueous caustic alkali, removing the aqueous caustic alkali, extracting the treated distillate with trimethyl sulfonium hydroxide dissolved in an oil-immiscible solvent not reactive with the alkali, removing the solvent from the extract, acidifying the residue to liberate and recover oil-soluble petroleum phenols and nitrating the mineral oil-soluble petroleum phenols and an emulsifier.

7. A readily emulsifiable insecticidal concentrate comprising white oil, a mixture of nitrated mineral oil-soluble phenols produced by first treating a high boiling petroleum distillate with aqueous caustic alkali, removing the aqueous caustic alkali, extracting the treated distillate with a strong alkali dissolved in an oil-immiscible solvent not reactive with the alkali, removing the solvent from the extract, acidifying the residue to liberate and recover oil-soluble petroleum phenols and nitrating the mineral oil-soluble petroleum phenols and an emulsifier.

8. A readily emulsifiable insecticidal concentrate comprising white oil, a mixture of nitrated mineral oil-soluble phenols produced by first treating a high boiling petroleum distillate with aqueous caustic alkali, removing the aqueous caustic alkali, extracting the treated distillate with trimethyl sulfonium hydroxide dissolved in isopropyl alcohol, removing the isopropyl alcohol from the extract, acidifying the residue to liberate and recover oil-soluble petroleum phenols and nitrating the mineral oil-soluble petroleum phenols and an emulsifier.

HENRY B. KELLOG.
PETER J. GAYLOR.